(12) United States Patent
Shah

(10) Patent No.: US 7,082,524 B2
(45) Date of Patent: Jul. 25, 2006

(54) I/O BUS ABSTRACTION FOR A CLUSTER INTERCONNECTION FABRIC

(75) Inventor: Rajesh R. Shah, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 302 days.

(21) Appl. No.: 10/448,699

(22) Filed: May 29, 2003

(65) Prior Publication Data

US 2003/0196003 A1    Oct. 16, 2003

Related U.S. Application Data (63) Continuation of application No. 09/448,518, filed on Nov. 24, 1999, now Pat. No. 6,591,309.

(51) Int. Cl.
*G06F 9/54* (2006.01)

(52) U.S. Cl. .................. 713/1; 713/2; 710/2; 710/131; 710/316; 709/228; 714/9; 714/14; 714/41; 719/324

(58) Field of Classification Search .................. 713/1, 713/2; 710/2, 62, 64, 131, 316; 709/228; 714/9, 14, 41; 719/324
See application file for complete search history.

(56) References Cited

U.S. PATENT DOCUMENTS

| | | | |
|---|---|---|---|
| 5,043,938 A | 8/1991 | Ebersole | |
| 5,991,797 A * | 11/1999 | Futral et al. | 709/216 |
| 6,112,263 A | 8/2000 | Futral | |
| 6,418,479 B1 | 7/2002 | Houssein et al. | |
| 6,473,827 B1 | 10/2002 | McMillen et al. | |
| 6,591,309 B1 * | 7/2003 | Shah | 710/2 |
| 6,687,766 B1 * | 2/2004 | Casper et al. | 710/20 |
| 6,760,783 B1 * | 7/2004 | Berry | 719/318 |

OTHER PUBLICATIONS

Microsoft Corp., "Plug and Play for Windows 2000 White Paper", In Microsoft Windows 2000 Professional, 1999, pp. 1-16.

* cited by examiner

*Primary Examiner*—A. Elamin
(74) *Attorney, Agent, or Firm*—Blakely, Sokoloff, Taylor & Zafman LLP (57) ABSTRACT

A host is coupled to a cluster interconnection fabric which includes a fabric-attached I/O controller. The host includes a processor, a memory coupled to the processor and an operating system. The operating system includes a kernel and a fabric bus driver to provide an I/O bus abstraction to the kernel for the cluster interconnection fabric. The fabric bus driver presents the cluster interconnection fabric to the kernel as a local I/O bus, and presents the fabric-attached I/O controller to the kernel as a local I/O controller attached to a local I/O bus.

8 Claims, 7 Drawing Sheets

EXAMPLE SOFTWARE DRIVER STACKS FOR COMPUTER
HAVING BUS-BASED I/O

FIG. 5

EXAMPLE SOFTWARE DRIVER STACKS FOR COMPUTER HAVING FABRIC-ATTACHED I/O

I/O BUS ABSTRACTION FOR A CLUSTER INTERCONNECTION FABRIC

The present patent application is a Continuation of application Ser. No. 09/448,518, filed Nov. 24, 1999, entitled "I/O Bus Abstraction For A Cluster Interconnection Fabric," now issued as U.S. Pat. No. 6,591,309.

FIELD

The disclosure generally relates to computers and more particularly to providing an input/output(I/O) bus abstraction for a cluster interconnection fabric.

BACKGROUND

Figure 1:
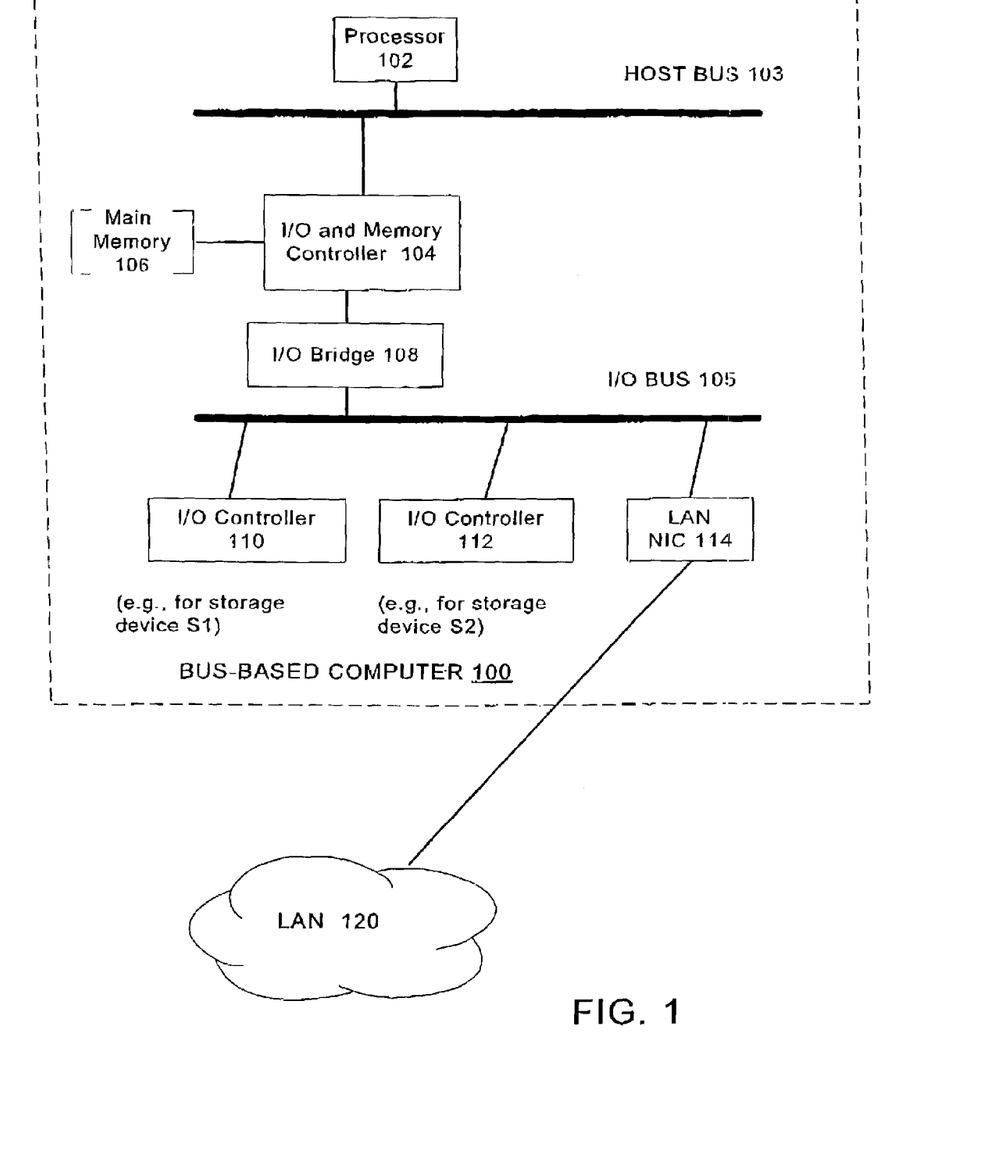
FIG. 1 is a block diagram illustrating a typical bus-based computer.

A cluster may include one or more hosts connected together by an interconnection fabric. In traditional clusters, hosts have locally attached I/O controllers connected to local I/O buses. FIG. 1 illustrates a typical bus-based computer 100, which includes a processor 102 connected to a host (or processor) bus 103 and an I/O and memory controller (or chipset) 104. A local I/O bus 105 may be considered local to computer 100 because, among other factors, it is physically located within the same cabinet as the processor 102 (or within very close proximity to processor 102). Local I/O bus 105 is connected to an I/O bridge 108. Several I/O devices are attached to the local I/O bus 105, including I/O controllers 110 and 112 and a Local Area Network (LAN) Network Interface Card (NIC) 114. The I/O controllers 110 and 112 may be connected to one or more I/O devices, such as storage devices, hard disk drives, or the like. I/O bus 105 is a traditional I/O bus, such as a Peripheral Component Interconnect (PCI bus) a Industry Standard Architecture (ISA) bus or Extended ISA (EISA) bus, etc. A traditional I/O bus provides attachment points to which I/O controllers can be attached.

A bus-based computer, such as that shown in FIG. 1, has a number disadvantages and drawbacks. All of the I/O controllers on the I/O bus share the same power and clock domain and share a common address space. Due to the physical and electrical load limitations, only a relatively small number of I/O controllers may be attached to an I/O bus, and must be physically located within the same cabinet as the processor (or within very close proximity). Thus, the entire I/O bus is physically attached to a single computer system. Also, in traditional clusters, I/O controllers are not directly connected to the network or cluster, but are provided only as part of another host. Thus, the I/O controllers on the I/O bus of a computer system are directly visible (or detectable) and addressable only by that computer system or host, but are not directly visible or addressable to any other host in the cluster.

For example, the I/O controllers 110 and 112 are visible only to computer 100, and are not visible or directly addressable to any other host which may be connected to LAN 120. To allow another host computer on LAN 120 (not shown) to access the I/O controllers 110 and 112 of host 100, the other host on LAN 120 must communicate through the processor 102 and the operating system of host computer 100 (rather than directly to the I/O controllers 110 and 112).

Therefore, bus-based computer systems provide a very inflexible arrangement for I/O resources. As a result, there is a need for a technique that provides a much more flexible arrangement for I/O devices for computer systems.

SUMMARY

According to an embodiment of the invention, a host to be coupled to a cluster interconnection fabric includes one or more fabric-attached I/O controllers. The host includes a processor, a memory coupled to the processor and an operating system. The operating system includes an I/O bus abstraction for the cluster interconnection fabric.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of embodiments of this invention. While the foregoing and following written and illustrated disclosure focuses on disclosing example embodiments of the invention, it should be clearly understood that the same is by way of illustration and example only and is not limited thereto. The spirit and scope of the present invention being limited only by the terms of the appended claims.

The following represents brief descriptions of the drawings, wherein.

DETAILED DESCRIPTION

Network Architecture

Figure 2:
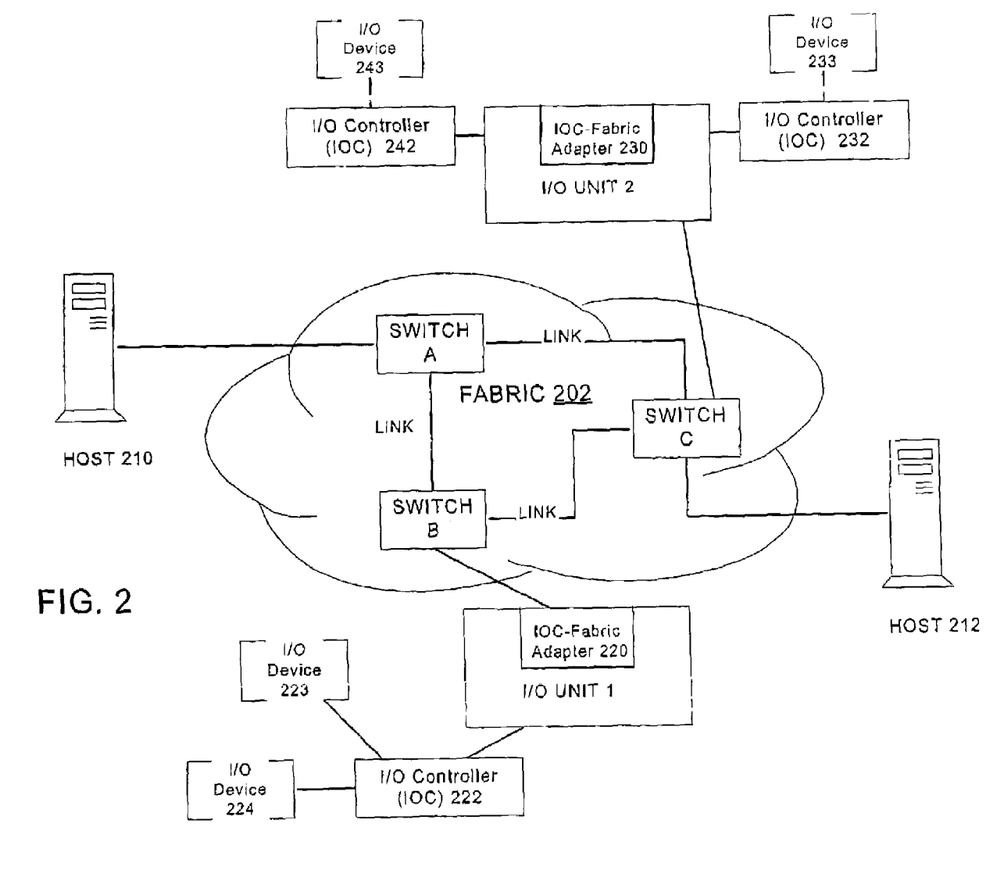
FIG. 2 is a block diagram illustrating an example network according to an embodiment of the present invention.

Referring to the figures in which like numerals indicate like elements, FIG. 2 is a block diagram illustrating an example network according to an embodiment of the present invention. A network is shown and may be a storage area network, a system area network or other type of network. The network includes several hosts, including host 210 and host 212, which may be personal computers, servers or other types of computers. A host generally is capable of running or executing one or more application-level (or user-level) programs. Also, a host is generally capable of initiating an I/O request (e.g., I/O reads or writes). Whereas, many I/O controllers or devices themselves do not typically run user-level programs and do not usually initiate I/O requests. Rather, I/O controllers and devices usually only perform some task or function in response to an I/O command or other request from a host.

The network includes one or more input/output units (I/O units) including I/O unit 1 and I/O unit 2. I/O unit 1 includes one or more I/O controllers connected thereto, including I/O controller 222. I/O unit 2 includes I/O controllers 232 and 242 connected thereto. The I/O units include components to interface the I/O controllers to the fabric 202. Each I/O controller operates to control one or more I/O devices. For example, I/O controller 222 of I/O unit 1 is connected to I/O devices 223 and 224. For I/O unit 2, I/O controller 232 is connected to I/O device 233, while I/O controller 242 is connected to I/O device 243. The I/O devices may be any of several types of I/O devices, such as storage devices (e.g., a hard disk drive, tape drive) or other I/O device.

The hosts and I/O units (and their attached I/O controllers and devices) may be organized into groups known as clusters, with each cluster including one or more hosts and typically one or more I/O units (each I/O unit including one or more I/O controllers). The hosts and I/O units are interconnected via a cluster interconnection fabric 202. Cluster interconnection fabric 202 is a collection of routers, switches and communication links (such as wires, connectors, cables, etc.) that connects a set of nodes (e.g., connects a set of hosts and I/O units) of one or more clusters. As shown in the example network of FIG. 2, the example fabric 202 includes switches A, B and C, and links connected between the switches.

In addition, each I/O unit includes an I/O controller-fabric (IOC-fabric) adapter for interfacing between the fabric 202 and the I/O controllers. For example, IOC-fabric adapter 220 interfaces the controllers of I/O unit 1 to the fabric 202, while IOC-fabric adapter 230 interfaces the controllers of I/O unit 2 to the fabric 202.

The number and arrangement of hosts, I/O units, I/O controllers, I/O devices, switches and links illustrated in FIG. 2 is provided only as an example. A wide variety of implementations and arrangements are possible.

Figure 3:
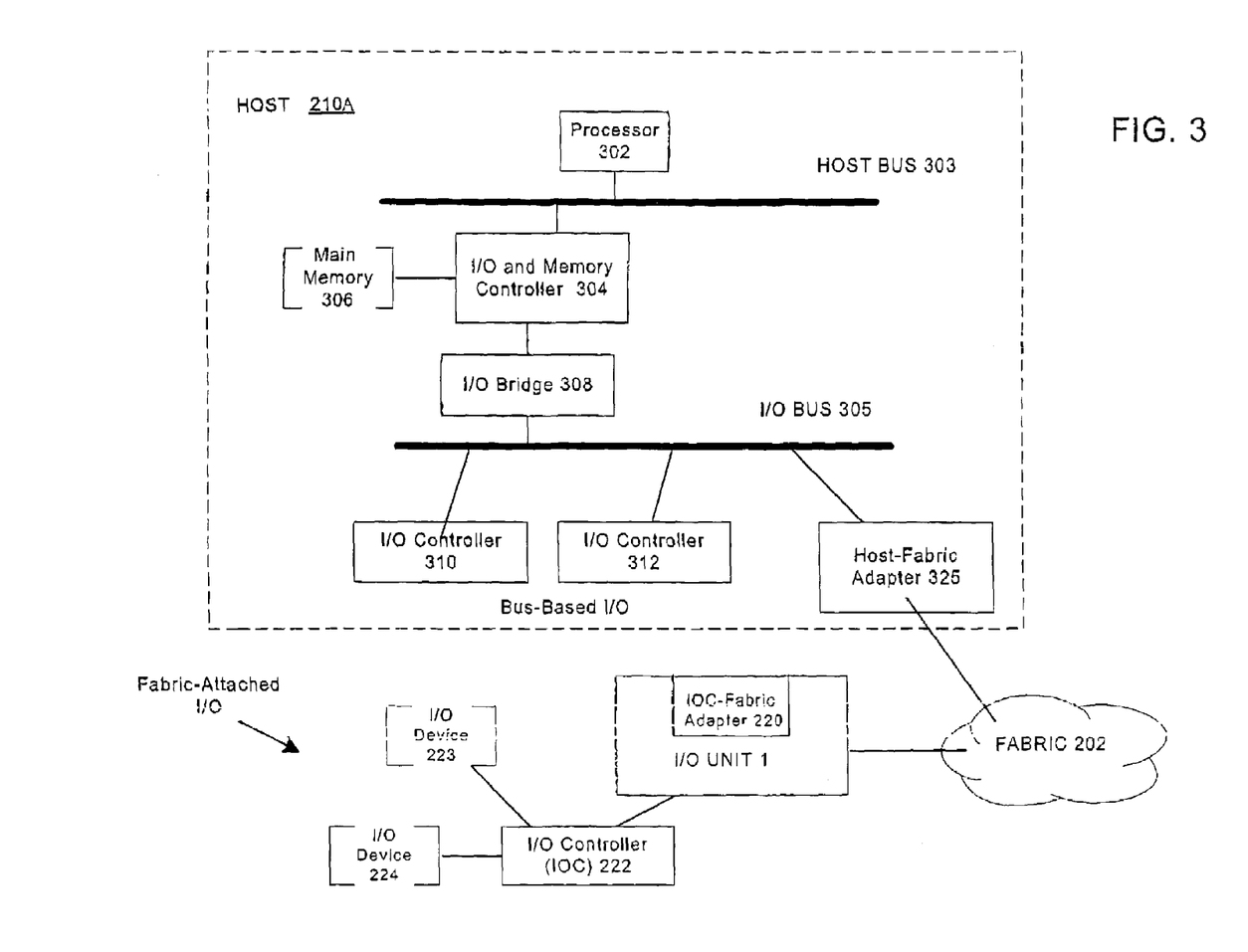
FIG. 3 is a block diagram of a host according to an example embodiment of the present invention.
Figure 4:
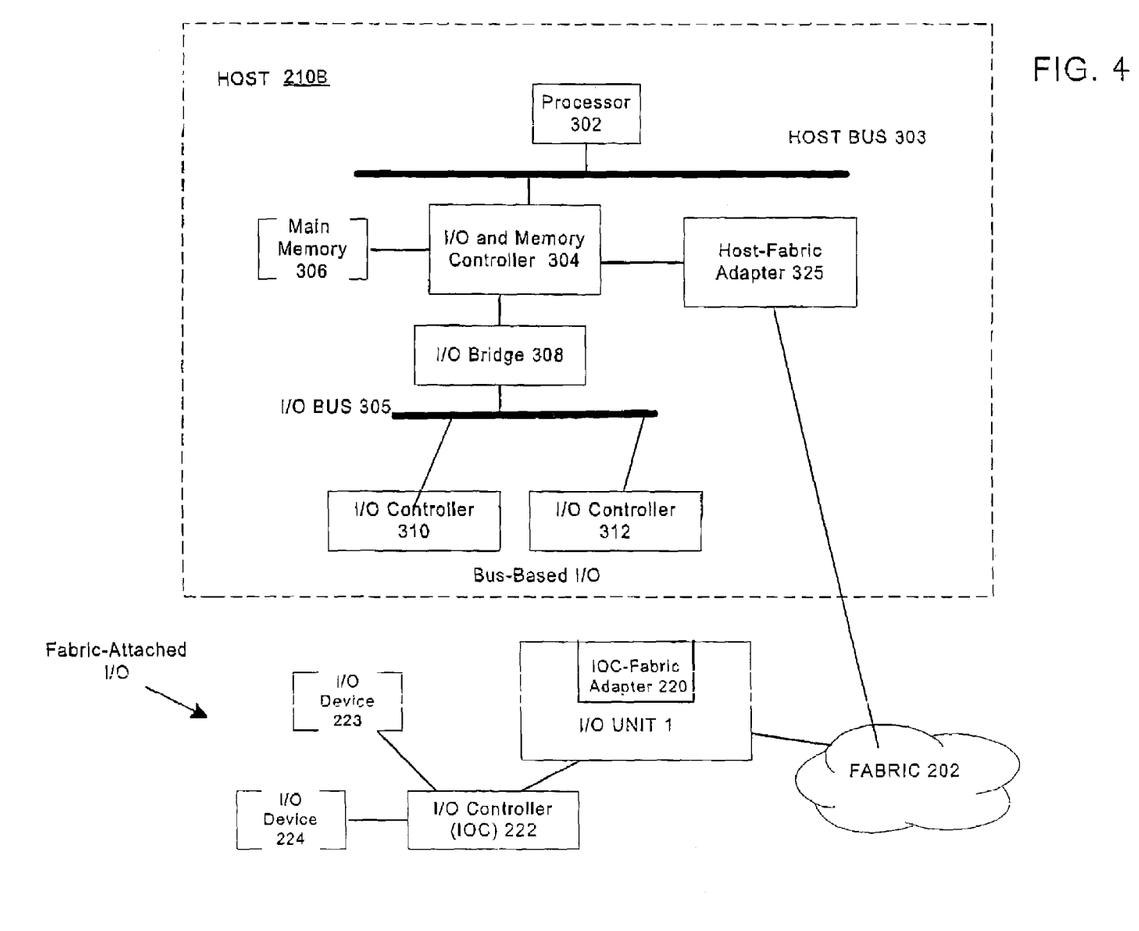
FIG. 4 is a block diagram of a host according to another example embodiment of the present invention.

Two embodiments of an example host (e.g., host 210) are illustrated in FIGS. 3 and 4. FIG. 3 is a block diagram of a host according to an example embodiment of the present invention. Referring to FIG. 3, a host 210A includes a processor 302 coupled to a host bus 303. An I/O and memory controller 304 (or chipset) is connected to the host bus 303. A main memory 306 is connected to the controller 304. An I/O bridge 308 operates to bridge or interface between the I/O and memory controller 304 and an I/O bus 305. Several I/O controllers are attached to I/O bus 305, including an I/O controllers 310 and 312. I/O controllers 310 and 312 (including any I/O devices connected thereto) are traditional bus-based I/O resources.

A host-fabric adapter 325 is also connected to the I/O bus 305. Host-fabric adapter 325 may be considered to be a type of a network interface card (e.g., usually including hardware and firmware) for interfacing the host 210A to cluster interconnection fabric 202. The host-fabric adapter 325 provides fabric communication capabilities for the host 210A. For example, the host-fabric adapter 325 converts data between a host format and a format that is compatible with the fabric 202. For data sent from the host 210, host-fabric adapter 325 formats the data into one or more packets, including a header. The host-fabric adapter 325 may provide reliability guarantees that the packets have reached the intended target or destination through a series of zero or more switches (in the fabric 202). In this embodiment shown in FIG. 3, the host-fabric adapter 325 is attached to a slot of I/O bus 305. I/O bus 305 may be any type of I/O bus, such as a PCI bus for example.

FIG. 4 is a block diagram of a host according to another example embodiment of the present invention. Referring to FIG. 4, a host 210B is illustrated and includes many of the same components as the host 210 of FIG. 3. Only the differences will be described. In FIG. 4, the host-fabric adapter 325 is connected directly to the chipset or I/O and memory controller 304, rather than being attached to an existing I/O bus. By connecting the host-fabric adapter 325 to the chipset or I/O memory controller, this can free or relieve the host-fabric adapter 325 of the limitations of the I/O bus 305. There are different ways in which the host-fabric adapter 325 can be connected to host 210. FIGS. 3 and 4 illustrate two examples of how this may be done.

According to one example embodiment or implementation, the components or units of the present invention are compatible with the Next Generation Input/Output (NGIO) Specification. Under such specification, the cluster interconnection fabric 202 is an NGIO fabric, the host-fabric adapter 325 is a Host Channel Adapter (HCA), and the IOC-fabric adapters are Target Channel Adapters (TCA). However, NGIO is merely one example embodiment or implementation of the present invention, and the invention is not limited thereto. Rather, the present invention is applicable to a wide variety of networks, hosts and I/O controllers.

As noted above, in traditional clusters the I/O controllers are not directly connected to the network or fabric, but are only attached as part of a host computer. However, according to an embodiment of the present invention (e.g., as shown in FIGS. 3 and 4), the I/O units and their I/O controllers are not connected to the fabric as a part of a host. Rather, the I/O units and I/O controllers are directly and separately connected to the cluster interconnection fabric 202 (and typically not as part of a host). For example, I/O unit 1 including controller 222 and I/O unit 2 including I/O controllers 232 and 242 are directly (or independently) connected to fabric 202. In other words, the I/O units (and their connected I/O controllers and I/O devices) are attached as separate and independent I/O resources to fabric 202 as shown in FIGS. 2–4, rather than as part of a host.

According to an embodiment, this provides a very flexible approach in which I/O units, I/O controllers (and I/O devices) connected to a cluster interconnection fabric can be assigned to one or more hosts in the cluster (rather than having a predetermined or fixed host assignment based upon being physically connected to the host's local I/O bus). The I/O units, I/O controllers and I/O devices which are attached to the cluster interconnection fabric 202 may be referred to as fabric-attached I/O resources (i.e., fabric-attached I/O units, fabric attached I/O controllers and fabric-attached I/O devices) because these are directly attached to the fabric 202 rather than being connected through (or as part of) a host.

In addition, according to an embodiment, the hosts in a cluster can detect and then directly address I/O units and I/O controllers (and attached I/O devices) which are directly attached to the cluster interconnection fabric 202 (i.e., the fabric-attached I/O controllers). However, a mechanism must be provided that allows a host to detect and address fabric-attached I/O controllers and devices, while preferably being compatible with many currently available operating systems.

A Fabric Bus Driver: Providing a Bus Abstraction to the OS for the Cluster Interconnection Fabric In many current operating systems, such as Windows 2000™ operating system, all I/O controllers are assumed to be attached to an I/O bus. In Windows 2000™ operating system, for example, there is separate kernel-mode software driver for each I/O bus, known as an I/O bus driver, which understands the specific characteristics, syntax, commands (or primitives), format, timing, etc. of that particular I/O bus. Under Windows 2000™ operating system, all bus drivers provide an interface or translation between the host operating system and the I/O controllers connected to the I/O bus for detecting or identifying the I/O controllers which are connected to the I/O bus, and reporting the I/O controllers to the operating system.

The operating system kernel uses one standard set of primitives or commands and syntax for communicating with each I/O bus driver, for example, to identify or enumerate the I/O controllers connected to each I/O bus, to configure the connected I/O controllers on each I/O bus, and other control functions. For example, the I/O bus drivers assist the host operating system in managing dynamic addition and removal of I/O controllers on that bus if the underlying bus hardware supports its. In addition, the I/O bus drivers assist the operating system in power managing (e.g., powering down I/O devices during non-use) the I/O controllers on that bus if the underlying bus and I/O controllers support it.

To allow communication between the operating system kernel and each of several different I/O buses, each of the I/O bus drivers translates between the I/O specific primitives and syntax to a standard set of primitives and syntax used by the operating system. The operating system can invoke or call specific or well known or standard commands or entry points in the bus driver to query the capabilities of the I/O bus and the attached I/O controllers (e.g., to request a list of attached I/O controllers and devices and to configure the I/O controllers) and to power manage the I/O controllers.

Figure 5:
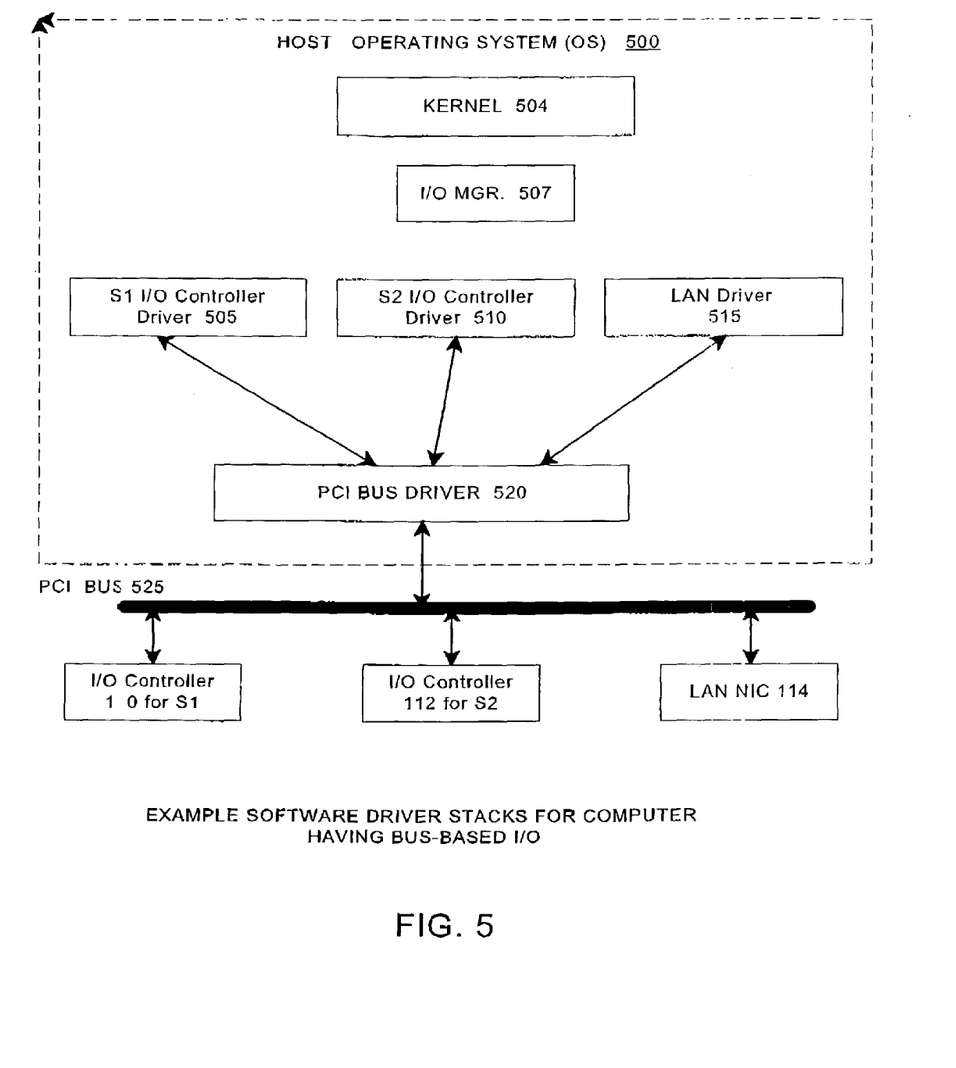
FIG. 5 is a block diagram illustrating an example software stack for a traditional computer having bus-based I/O.

FIG. 5 is a block diagram illustrating an example software stack for a traditional computer having bus-based I/O. A host operating system 500 is in communication with an I/O bus, such as a PCI bus 525 for example. Several I/O devices are attached to the slots of the PCI bus 525, including I/O controller 110 for a storage device S1, an I/O controller 112 for a storage device S2, and a LAN NIC 114.

The host operating system 500 includes a kernel 504 and an I/O manager 507 for managing the I/O buses and attached I/O resources (I/O controllers and devices). The operating system 500 also includes a PCI bus driver 520 (as an example I/O bus driver) which translates between the PCI specific primitives and syntax to a standard set of primitives and syntax used by the kernel 504 or I/O manager 507. The PCI bus driver 520 is provided for detecting or enumerating the I/O controllers and devices attached to the PCI bus 525, to configure the attached I/O controllers and devices, to inform the I/O manager 507 when controllers or devices have been added or removed, and for handling power management commands issued from the operating system to power manage the PCI controllers and devices (if power management is supported by those devices).

However, the PCI bus driver 520 is not aware of the different features and capabilities of the different I/O controllers. Therefore, operating system 500 includes an I/O controller driver (or function driver) for each I/O controller, including a S1 I/O controller driver 505 (for storage device S1 connected to I/O controller 110), an S2 I/O controller driver 510 (for storage device S2 connected to controller 112) and a LAN driver 515, as examples. Each I/O controller driver is provided for translating I/O requests (e.g., reads and writes to the I/O device) from a common or standard set of primitives and syntax used buy the host operating system to the primitives and syntax used by each I/O controller (e.g., after the I/O bus driver is used to identify and configure the I/O controller). Thus, an I/O controller driver is provided to handle reads and writes to the I/O devices connected to an I/O controller. There may typically be a different type of I/O controller driver for each type of I/O controller.

As noted above, a limitation with this current operating system and software driver stack is that all I/O controllers are assumed to be attached to a local I/O bus. The host can only detect and address I/O devices that are attached to the local I/O bus. In other words, even if one provides one or more fabric-attached I/O controllers, current operating systems do not allow a host to detect the presence or directly communicate with such fabric-attached I/O controllers and devices because all I/O controllers are presumed to be attached to a local I/O bus of the host, and current operating systems also do not support direct communication with a remote (or fabric-attached) I/O controller.

Figure 6:
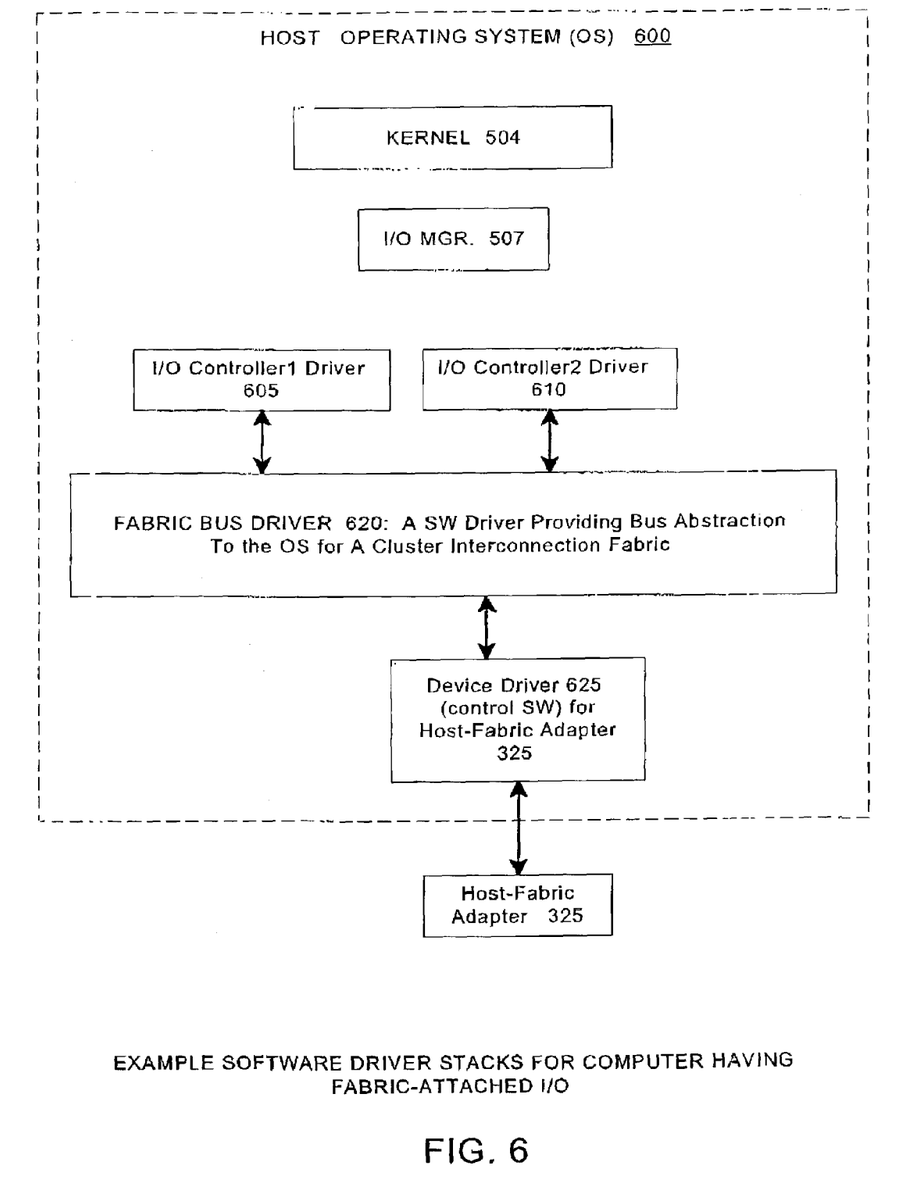
FIG. 6 is a block diagram illustrating a software driver stack for a computer having fabric-attached I/O resources according to an example embodiment of the present invention.

FIG. 6 is a block diagram illustrating a software driver stack for a computer having fabric-attached I/O resources according to an example embodiment of the present invention. Referring to FIG. 6, the host operating system 600 includes a kernel 504, an I/O manager 507, and a plurality of I/O controller drivers for interfacing to various I/O controllers, including I/O controller drivers 605 and 610. These components are the same as or similar to the currently available operating system illustrated in FIG. 5. According to an example embodiment, the host operating system 600 is Windows 2000™ operating system, and the I/O manager 507 is a Plug-n-Play manager.

In addition, according to an embodiment of the invention, a fabric bus driver 620 (or pseudo bus driver) is provided for the cluster interconnection fabric 202. A traditional bus driver translates between the I/O bus specific primitives and syntax to a standard set of primitives and syntax used by the operating system. Likewise, the fabric bus driver 620 accepts the same set of standard operating system commands or primitives and syntax and translates them into fabric specific primitives, syntax and format, etc. The fabric bus driver 620 also provides the same set of services to the operating system as provided by other I/O bus drivers, and communicates with the kernel 504 or I/O manager 507 through the same common or standard set of primitives and syntax used by the operating system. Therefore, the fabric bus driver 620 abstracts or generalizes or presents the fabric 202 to the operating system 600 as a locally attached I/O bus, even though the cluster interconnection fabric 202 is not a bus and is not local. Thus, it can be said that the fabric bus driver 620 provides a bus abstraction to the operating system 600 (or to the I/O manager 507) for the cluster interconnection fabric 202. Thus, the fabric bus driver 620 may be thought of as a bus abstraction component.

A device driver 625 is provided for the host-fabric adapter 325. The device driver 625 controls the host-fabric adapter 325 (which is usually a card or hardware). The fabric bus driver 620 uses the communication services provided by the device driver 625 for the host-fabric adapter 325 to send and receive commands and information over the fabric 202. Thus, the host processor 302 can issue I/O requests (e.g., I/O reads, writes) to fabric-attached I/O controllers through the fabric bus driver 620, the device driver 625 and the host-fabric adapter 325. The host-fabric adapter 325 translates I/O requests between a host compatible format and a fabric compatible format. In this manner, the host processor 302 can communicate with fabric attached I/O controllers. The host processor 302 and the host operating system 600 do not have to be aware that the fabric-attached I/O controllers are not attached to a local I/O bus since the I/O bus abstraction and the host/fabric translations are transparent to the processor 302 and operating system 600.

Although the fabric 202 is not a bus in the traditional sense, it is also advantageous for the fabric bus driver 620 to provide a bus abstraction to the I/O manager 507 so that the fabric attached I/O controllers can participate in the overall Plug-n-Play procedures (e.g., dynamic addition and removal of I/O controllers) and power management functions implemented by the host operating system. In order to provide the bus abstraction, the fabric bus driver 620 (like the other bus drivers) communicates to the kernel 504 or I/O manager 507 using the standard set of primitives and syntax used and expected by the kernel and I/O manager 507 of operating system 600. The fabric bus driver 620 provides a standard set of services to the operating system 600 provided by bus drivers. Thus, the fabric bus driver 620 presents the cluster interconnection fabric 202 to the I/O manager 507 as a local I/O bus, and presents one or more fabric-attached I/O controllers as local (or bus-based) I/O controllers. In this manner, the operating system does not have to be aware that the I/O resource (or fabric) behind the fabric bus driver 620 is not a local bus, but rather is a cluster interconnection fabric 202 including one or more remote fabric attached I/O controllers. The existence of the cluster interconnection fabric 202 and the remote location of the fabric 202 and fabric-attached I/O controllers are preferably transparent to the host operating system 600. Thus, according to an embodiment, no changes are necessary in the kernel 504 or I/O manager 507 to allow the host 210 to identify and communicate with fabric-attached I/O controllers.

The operating system 600 (or the I/O manager 507 of OS 600) uses a standard set of primitives and syntax to query each I/O bus driver to identify the I/O controllers attached to the bus. In the same fashion, using these same standard set of primitives and syntax, the I/O manager 507 can query the fabric bus driver 620 to identify the fabric-attached I/O controllers that are assigned to the host (as if the fabric bus driver 620 was just another I/O bus driver). Many I/O controllers may be attached to the fabric 202. However, according to an embodiment of the invention, the fabric-attached I/O controllers (and their I/O devices) may be allocated or assigned to different hosts. According to one embodiment, each I/O controller can be assigned or allocated to only one host. Alternatively, an I/O controller can be assigned to multiple hosts (or shared among hosts). The fabric bus driver 620 then identifies the fabric-attached I/O controllers that are assigned to the host and reports this list of I/O controllers to the I/O manager 507 using the standard set of primitives and syntax used by other local I/O bus drivers to communicate with the I/O manager 507. Thus, the fabric bus driver 620 presents the fabric 202 as a local I/O bus to the operating system 600 (or to I/O manager 507) and presents the fabric-attached I/O controllers as local I/O controllers.

The fabric bus driver 620 can identify the list of fabric-attached I/O controllers assigned to the host in many different ways. A list of I/O controllers assigned to the host may be locally stored and accessed by the fabric bus driver 620, or the fabric bus driver 620 may query an external database or other host attached to the fabric 202 to obtain the list of I/O controllers assigned to this particular host, as examples.

Figure 7:
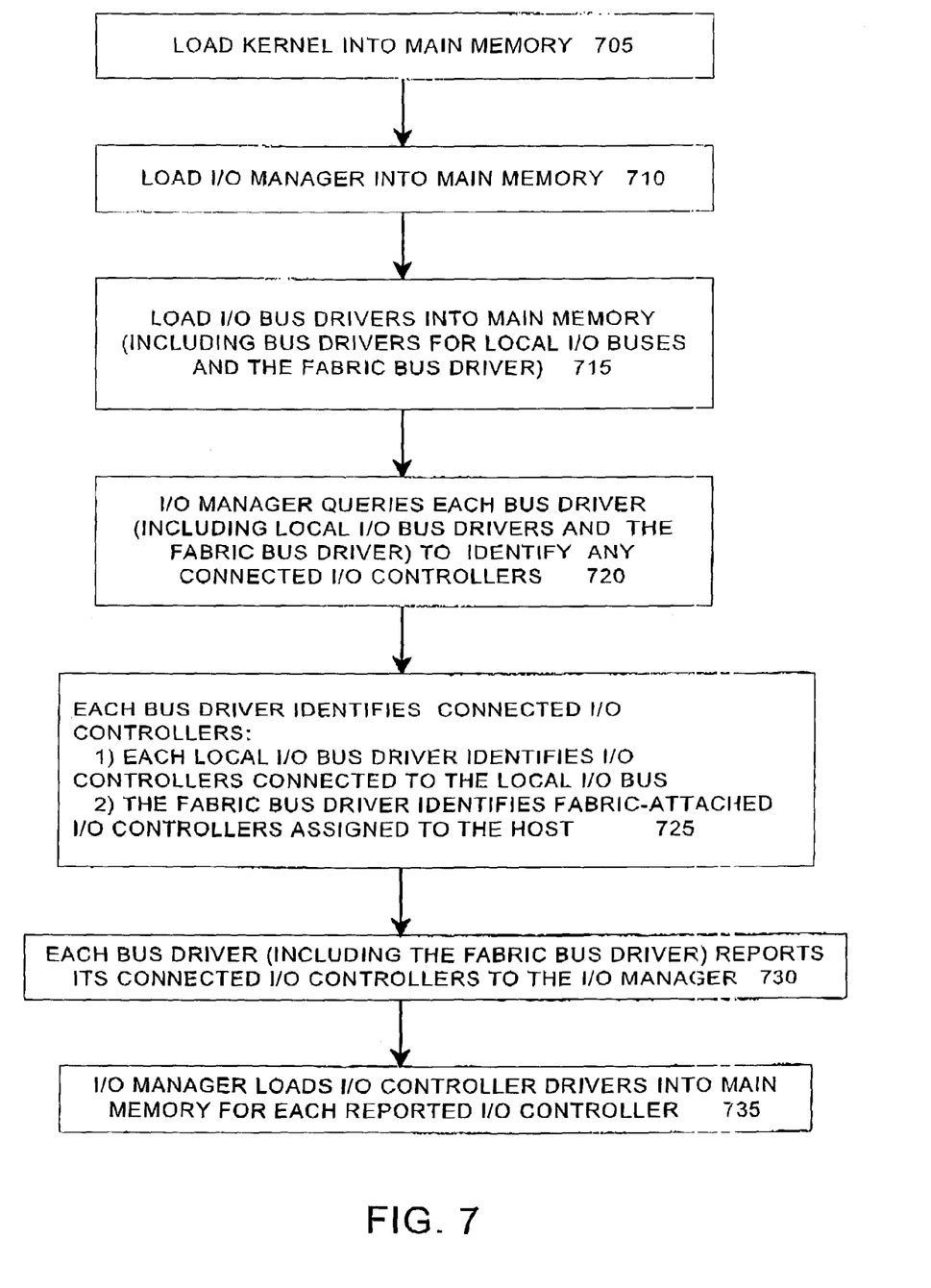
FIG. 7 is a flow chart identifying the steps which may performed by a host during host initialization according to an example embodiment of the present invention.

FIG. 7 is a flow chart identifying the steps performed by a host during host initialization according to an example embodiment of the present invention. At block 705, kernel 504 is loaded into main memory (e.g., at power-on with the assistance of the execution of the Basic Input Output System or BIOS). The Kernel 504 then executes to perform several other tasks or functions for initialization. At block 710, the I/O manager 507 is loaded into main memory and executed.

At block 715, each of the I/O bus drivers are loaded into main memory and executed. These I/O bus drivers loaded into main memory include the I/O bus drivers for the local I/O buses (e.g., a PCI bus driver) and the fabric bus driver 620. As noted above, the fabric bus driver 620 is presented to the operating system 600 as a local I/O bus driver.

At block 720, the I/O manager 507 queries (or requests) each bus driver (including the fabric bus driver 620) to identify any connected I/O controllers.

At block 725, each bus driver identifies each connected I/O controller. The local I/O bus drivers identify each I/O controller connected to the corresponding local I/O buses. Similarly, the fabric bus driver 620 identifies each fabric-attached I/O controller which is assigned to the host.

At block 730, each I/O bus driver (including the fabric bus driver 620) reports to the I/O manager 507 a list of the connected I/O controllers as requested.

At block 735, the I/O manager 507 loads an I/O controller driver (specific to each type of I/O controller) into main memory for each type of I/O controller reported to the I/O manager 507. This allows the processor 302 to communicate with each reported I/O controller to issue I/O requests (e.g., reads and writes) to one or more I/O devices connected to the I/O controller, etc. According to an embodiment, where there are several I/O controllers of one type, an instance of the corresponding I/O controller driver may be loaded into main memory for each instance of the I/O controller.

Several embodiments of the present invention are specifically illustrated and/or described herein. However, it will be appreciated that modifications and variations of these embodiments of the present invention are covered by the above teachings and within the purview of the appended claims without departing from the spirit and intended scope of these embodiments of the invention. For example, while embodiments of the present invention have has been described with reference to a network, the various aspects of these embodiments of the present invention are applicable to a wide variety of networks, including system area networks, storage area networks, Local Area Networks (LANs), Wide Area Networks (WANs), the Internet, etc.

What is claimed is:

1. A method comprising:
    loading into memory in a host one or more drivers, the one or more drivers including a fabric driver that is capable of identifying a plurality of controllers of one type that may be coupled to the host via a fabric and reporting that the plurality of controllers are coupled to the host via the fabric; and
    loading into the memory a plurality of controller driver instances to permit the host to communicate with the plurality of controllers.

2. The method of claim 1, wherein:
    the one or more drivers comprise at least one bus driver that is capable of identifying one more other controllers that may be coupled to a bus in the host.

3. The method of claim 2, wherein:
    the one or more controllers comprise at least one input/output (I/O) controller.

4. The method of claim 2, wherein:
    the one or more controllers are coupled to one or more input/output (I/O) devices, and the host is capable of directly addressing the one or more I/O devices.

5. An apparatus comprising:
    a host comprising a memory;
    one or more drivers to be loaded into the memory, the one or more drivers including a fabric driver that is capable of identifying a plurality of controllers of one type that may be coupled to the host via a fabric, and reporting that the one or more controllers are coupled to the host via the fabric; and a plurality of controller driver instances to be loaded in the memory to permit the host to communicate with the plurality of controllers.

6. The apparatus of claim 5, wherein:

the host also comprises a bus; and the one or more drivers comprise least one bus driver that is capable of identifying one more other controllers that may be couple to the bus.

7. The apparatus of claim 5, herein:

the one or more controllers comprise at least one input/output (I/O) controller.

8. The apparatus of claim 5, wherein:

the one or more controllers are coupled to one or more input/output (I/O) devices, and the host is capable of directly addressing the one or more I/O devices.

* * * * *